United States Patent

Capstick et al.

[11] Patent Number: 6,105,356
[45] Date of Patent: Aug. 22, 2000

[54] DRIVE CHAIN

[75] Inventors: Bryan William Capstick, Gorton; Edward Joseph Brownhill; Michael Charles Christmas, both of Cheadle Hulme, all of United Kingdom

[73] Assignee: Renold PLC, Manchester, United Kingdom

[21] Appl. No.: 09/171,278
[22] PCT Filed: Mar. 12, 1997
[86] PCT No.: PCT/GB97/00673
§ 371 Date: Mar. 8, 1999
§ 102(e) Date: Mar. 8, 1999
[87] PCT Pub. No.: WO97/39257
PCT Pub. Date: Oct. 23, 1997

[30] Foreign Application Priority Data

Apr. 18, 1996 [GB] United Kingdom .................... 9608003

[51] Int. Cl.[7] .................................................. F16G 13/06
[52] U.S. Cl. .............................. 59/4; 59/5; 59/78; 59/84; 474/209
[58] Field of Search .................... 59/78, 84, 4, 5, 59/8; 474/209

[56] References Cited

U.S. PATENT DOCUMENTS

| 2,012,947 | 9/1935 | Bosnian . |
| 2,844,042 | 7/1958 | Mercier . |
| 2,869,380 | 1/1959 | Lemmon ................................ 474/206 |
| 4,134,255 | 1/1979 | McBain et al. ............................. 59/78 |

FOREIGN PATENT DOCUMENTS

| 140173 | 4/1903 | Denmark . |
| 406741 | 2/1910 | France . |

*Primary Examiner*—David Jones
*Attorney, Agent, or Firm*—Akin, Gump, Strauss, Hauer & Feld, L.L.P.

[57] ABSTRACT

A drive chain has a plurality of links (1) each comprising a pair of opposed cranked link plates (2). Each link plate (2) has two connection apertures (7) and is connected to an adjacent link plate (2) by a pin (6) passing through overlapping connection apertures. An aperture (7) at one end of each link plate is fitted with a sleeve (11) in which said pin (6) is releasably engaged by means of a key connection. The sleeve (11) is connected to said link plate (2) by means of an interference fit with the respective connection aperture (7).

8 Claims, 1 Drawing Sheet

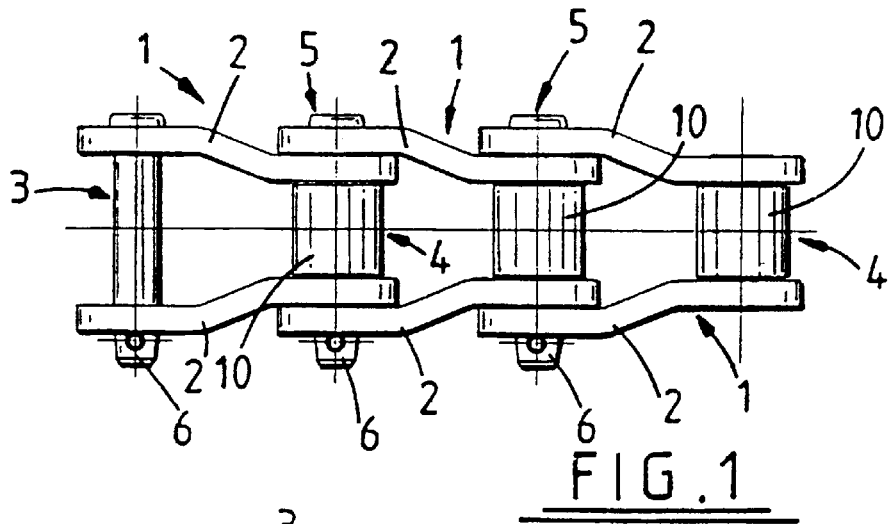
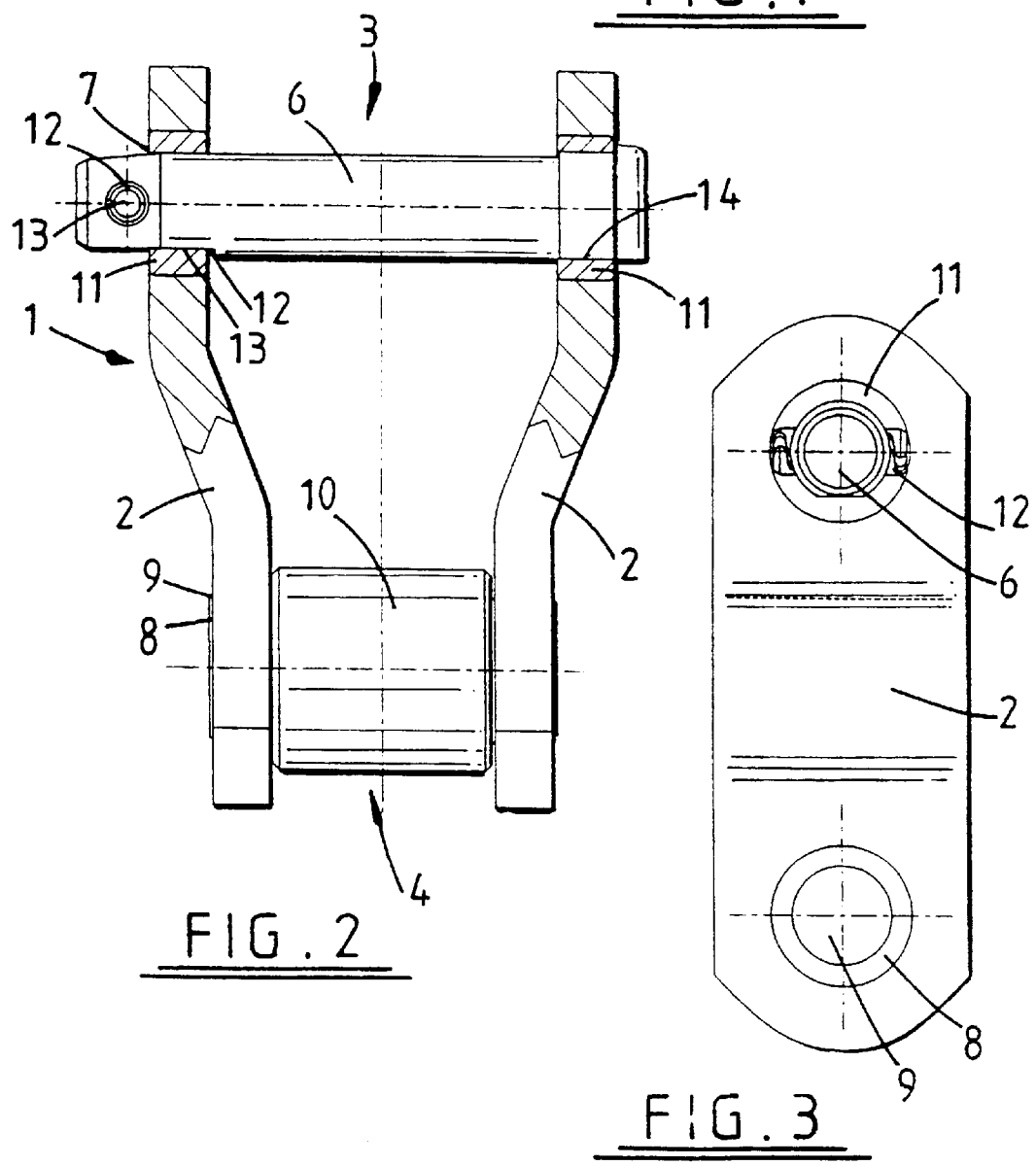

ic chain so as to reduce excessive slack. Moreover,

DRIVE CHAIN

CROSS-REFERENCE TO RELATED APPLICATIONS

This application claims priority from PCT Patent Application No. GB97/00673 filed on Mar. 12, 1997, and Great Britain Patent Application No. GB 9608003.1 filed on Apr. 18, 1996.

BACKGROUND OF THE INVENTION

The present invention relates to a drive chain and more particularly but not exclusively, to a roller-type chain.

In many chain drive applications links of the chain extend with use and the chain can become slack particularly during the period of initial use when components of the chain are "worn in". In such circumstances it is necessary to remove links of the chain so as to reduce excessive slack. Moreover, it is sometimes necessary to detach the chain from the drive assembly in which it is used in order that maintenance work on the drive assembly can be performed. Furthermore, in certain applications it is desirable for long lengths of chain to be separated into manageable lengths for transport and delivery purposes. For example, leisure park rides such as roller-coasters or the like generally use continuous loop drive chains to transport a vehicle in at least part of its ride. In the case of travelling fairs rides of this type have to be designed so that they are easily transportable. Other permanent amusement or leisure parks may have temporary "guest" or on-loan amusement rides which are only present for a limited period of time before they are dismantled and transported elsewhere.

Conventional roller chains comprise a sequence of links interconnected by pins which are interference fits in holes provided in the chain links. Each pin is located in a fixed bush which supports a rotatable cylindrical roller. In order to detach a drive chain from its assembly or to remove links it is necessary to remove one or more pins. Removal of the pin from an interference fit connection with the respective link causes wear and damage to the holes in the link. This is a particular problem with chains having cranked links as a new replacement link cannot be inserted without causing damage since this would involve removing the next pin in the chain thereby causing damage to the adjacent link in the chain.

In order to solve this problem it is known to use slip-fit pins in chains where frequent disconnection is required. A slip-fit connection between each pin and the corresponding hole in each link plate enables the chain to be disconnected many times without damaging the chain. However, the use of slip-fit connections reduces the fatigue resistance of the chain as a whole since the fatigue performance of the connection does not match that of the rest of the chain and is impaired since it is dependent on an interference fit between the pin and link plate in order to provide pre-stressing in the link plate hole. Pre-stressing is known to improve significantly fatigue resistance of the connection.

It is an object of the present invention to obviate or mitigate the aforesaid disadvantages.

SUMMARY OF THE INVENTION

According to the present invention there is provided a drive chain having a plurality of links each comprising a pair of opposed link plates, each link plate having at least two connection apertures and each link being connected to an adjacent link by a pin passing through overlapping connection apertures in adjacent link plates, wherein at least one of the connection apertures in each link plate is lined with a sleeve in which said pin is releasably engaged, the sleeve being fixedly engaged with said link plate.

Preferably the pin is in slip-fit engagement with said sleeve.

The sleeve may be in interference-fit engagement with the respective link plate.

Preferably there is a provided an anti-rotation feature between the pin and sleeve. The anti-rotation feature may be a key-connection such as flats on each of the pin and the sleeve, or a splined connection.

Conveniently there is provided releasable means to prevent axial release of the pin. This may be in the form of a roll pin passing through a diametral bore in the pin and extending beyond each end of the bore.

BRIEF DESCRIPTION OF THE DRAWINGS

A specific embodiment of the present invention will now be described, by way of example only, with reference to the accompanying drawings in which:

FIG. 1 is a plan view of part of a drive chain of the present invention;

FIG. 2 is a part sectioned view of a link of the chain of FIG. 1; and

FIG. 3 is a side view of the link of FIG. 2 in the direction of arrow Z.

DETAILED DESCRIPTION

Referring now to the drawings, FIG. 1 shows a cranked link drive chain of the type that is commonly used in amusement rides to transport carriages of, for example, a roller-coaster ride during uphill portions of the ride.

The chain comprises a plurality of links 1 each comprising a pair of opposed cranked link plates 2. Since the link plates 2 are cranked the spacing between the opposed link plates 2 at a first (wide) end 3 of the link 1 is greater than that at a second (narrow) end 4 and is sized so that the wide end 3 of each link 1 receives the narrow end 4 of an adjacent link 1.

Adjacent links 1 are interconnected by a pin and bush assembly (indicated generally by arrow 5) at their overlapping ends. The assembly 5 comprises a pin 6 that is fixed in apertures 7 in each link plate 2 at the wide end 3 of each link 1 and is rotatable within a bush 8 fixed in insertion holes 9 in each link plate pair 2 at the narrow end 4 of each link 1. The bush 8 extends across the spacing between the link plates 2 and rotatably supports a cylindrical roller 10 mounted on its outer surface.

Referring now to FIG. 2, the apertures 7 in each link plate 2 are each lined by a sleeve 11 in which an end of the pin 6 is received. The outside diameter of the sleeve 11 is an interference fit with the diameter of the corresponding aperture 7 so that it is firmly fixed relative to the link plate 2, whereas the inside diameter of the sleeve 11 is designed to releasably engage the pin 6 in a slip-fit or relatively light interference-fit connection (so as to permit easy removal of the pin). In the embodiment shown in FIG. 2 the pin 6 is shown as having a flat 12 at one end engaging with a corresponding flat 13 in the sleeve 11 and at the other end a flat 14 engaging a corresponding flat in the corresponding sleeve 11. The purpose of the connection between the pin 6 and either sleeve 11 is to prevent relative rotational movement. In practice any form of key-type connection between the pin and sleeve would be suitable. Only one end of the pin may have such an engagement with the corresponding sleeve.

The pin 6 is axially retained in the link 1 by means of a roll pin 15 or the like fitted in a bore 16 at one end of the pin 6 and extending beyond the length of the bore 16.

The releasable connection between the pin 6 and each sleeve 11 permits relatively easy and repeated removal of the pin 6 without causing damage to or weakening the link plates 2. Furthermore, by using a sleeve 11 of the type described above the quality of the circular aperture 7 and the interference fit between the pin 6 and link plate 2 are not affected so that fatigue resistance and strength characteristics of each link are not compromised.

The key-connection between the pin 6 and the sleeve 11 prevents rotation of the pin 6 relative to the sleeve 11 thereby preventing damage to the internal surface of the sleeve 11 or pin 6 caused by turning.

The pin 6 is removed simply by striking it in an axial direction so that it is axially released from its key-connection with the sleeve 11. Easy removal of the pin 6 allows the chain to be detached from the drive assembly for maintenance purposes or to be separated for ease of transport in the case of a long chain. Moreover, adjustment of the chain length by removal of links is simplified.

It is anticipated that the sleeve 1 may be manufactured from a material that has fatigue resistance characteristics that are better than those of the link plate material, thereby achieving better fatigue life than present designs.

It will be appreciated that numerous modifications to the above described design may be made without departing from the scope of the invention as defined in the appended claims. For example, any form of releasable slip-fit or light interference fit connection between the pin and sleeve may be used. In addition, any secure fixing between the sleeve and link plate may be adopted. It will also be understood that the invention has application to any form of transmission chain and not just the cranked-link chain shown in the accompanying drawings. For example, in a conventional non-cranked roller chain comprising inner and outer link plate pairs, the sleeve may be fitted in at least one aperture in each of the outer or inner link plate pairs, or both.

What is claimed is:

1. A drive chain having a plurality of links each comprising a pair of opposed link plates, each link plate having at least two connection apertures and each link being connected to an adjacent link by a pin passing through overlapping connection apertures in adjacent link plates, wherein at least one of the connection apertures in each link plate is lined with a sleeve in which said pin is releasably and non-rotatably engaged, the sleeve being fixedly engaged with said link plate and being substantially coterminous with the length of the connection aperture.

2. A drive chain according to claim 1, wherein the pin is in slip-fit engagement with said sleeve.

3. A drive chain according to claim 1, wherein the sleeve is in interference-fit engagement with said link plate.

4. A drive chain according to claim 1, further including means for preventing rotation between the pin and the sleeve.

5. A drive chain according to claim 4, wherein said means includes a key-type connection.

6. A drive chain according to claim 5, wherein the key-type connection includes engageable flats on each of the pin and the sleeve.

7. A drive chain according to claim 1, further including means for preventing axial release of said pin.

8. A drive chain assembly according to claim 7, wherein the means to prevent axial release is a roll pin passing through a bore in the pin and extending beyond each end of the bore.

* * * * *